(12) United States Patent
Iida et al.

(10) Patent No.: US 8,313,135 B2
(45) Date of Patent: Nov. 20, 2012

(54) LOWER STRUCTURE OF VEHICLE DOOR

(75) Inventors: Yoshimitsu Iida, Wako (JP); Yoshimi Hasegawa, Wako (JP); Akihito Noro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 12/829,388

(22) Filed: Jul. 2, 2010

(65) Prior Publication Data

US 2011/0012388 A1 Jan. 20, 2011

(30) Foreign Application Priority Data

Jul. 14, 2009 (JP) ................................. 2009-166021

(51) Int. Cl.
*B60J 10/08* (2006.01)
(52) U.S. Cl. ..................................................... 296/146.9
(58) Field of Classification Search ............... 296/146.9, 296/146.1, 146.5, 146.6, 146.7, 209; 49/502, 49/475.1, 489.1, 490.1; 180/891.2; 280/749, 280/728.2
See application file for complete search history.

(56) References Cited

U.S. PATENT DOCUMENTS

| | | | | |
|---|---|---|---|---|
| 4,607,878 A * | 8/1986 | Itoh | | 296/199 |
| 4,892,348 A | 1/1990 | Nozaki | | |
| 5,355,628 A * | 10/1994 | Dranchak | | 49/483.1 |
| 6,397,525 B1 * | 6/2002 | Ishibashi et al. | | 49/484.1 |
| 6,601,345 B2 * | 8/2003 | Nozaki et al. | | 49/483.1 |
| 6,926,944 B2 * | 8/2005 | Watanabe | | 428/122 |
| 7,040,682 B2 * | 5/2006 | Tokumoto et al. | | 296/1.08 |
| 7,168,757 B2 * | 1/2007 | Futatsuhashi | | 296/209 |
| 7,363,749 B2 * | 4/2008 | Sultan et al. | | 49/490.1 |
| 7,841,636 B2 * | 11/2010 | Huth et al. | | 296/1.08 |
| 2004/0088925 A1 * | 5/2004 | Nozaki | | 49/498.1 |
| 2007/0199247 A1 * | 8/2007 | Oba et al. | | 49/498.1 |
| 2008/0122251 A1 * | 5/2008 | Okajima et al. | | 296/146.9 |
| 2009/0266000 A1 * | 10/2009 | Minoura et al. | | 49/490.1 |
| 2010/0164248 A1 * | 7/2010 | Stoll | | 296/146.7 |
| 2011/0078959 A1 * | 4/2011 | Nozaki | | 49/489.1 |

FOREIGN PATENT DOCUMENTS

JP 64-3687 Y2 1/1984

(Continued)

OTHER PUBLICATIONS

Chinese Office Action for corresponding CN Application No. 201010197503.4, Oct. 26, 2011.
Japanese Office Action for corresponding JP Application No. 2009-166021, Jul. 12, 2011.
Japanese Office Action for corresponding JP Application No. 2009-166021, Apr. 19, 2011.
Japanese Office Action for corresponding JP Application No. 2011-20795 (2009-166021), Dec. 6, 2011.

*Primary Examiner* — Kiran B Patel
(74) *Attorney, Agent, or Firm* — Ditthavong Mori & Steiner, P.C.

(57) ABSTRACT

A lower structure of a vehicle door includes a door body, a garnish, and an elastic seal. The door body is attached to a door opening of a vehicle body so as to be openable. The garnish covers an outer lower portion of the door body. The elastic seal includes a holding portion that clamps a flange portion at a lower end of the door body. The elastic seal is joined to the garnish. The garnish is supported by the door body via the elastic seal.

19 Claims, 6 Drawing Sheets

FOREIGN PATENT DOCUMENTS

| | | |
|---|---|---|
| JP | 1-145818 U | 10/1989 |
| JP | 2-045857 U | 3/1990 |
| JP | 02-117945 U | 9/1990 |
| JP | 2-290755 | 11/1990 |
| JP | 04-67108 U | 6/1992 |
| JP | 4-096526 U | 8/1992 |
| JP | 7-205731 | 8/1995 |
| JP | 2001-088627 | 4/2001 |
| JP | 2007-210385 | 8/2007 |
| JP | 2008-179282 | 8/2008 |

* cited by examiner

LOWER STRUCTURE OF VEHICLE DOOR

CROSS REFERENCES TO RELATED APPLICATIONS

The present application relates to Japanese Patent Application No. 2009-166021, filed Jul. 14, 2009, entitled "Lower structure of vehicle door." The contents of this application are incorporated herein by reference in their entirety.

BACKGROUND OF THE INVENTION

1. Field of the Invention

The present invention relates to a lower structure of a vehicle.

2. Discussion of the Background

Known lower structures of vehicle doors include elastic seals that seal between lower portions of door bodies and vehicle bodies and garnishes disposed at the lower portions of the door bodies.

Generally, such lower structures of vehicle doors include elastic seals and garnishes separately attached to door bodies.

Japanese Unexamined Utility Model Registration Application Publication No. 2-117945 and Japanese Examined Utility Model Registration Application Publication No. 64-3687, for example, describe such lower structures of vehicle doors including garnishes attached to door bodies using screws or fasteners.

In the lower structure of the vehicle door described in Japanese Unexamined Utility Model Registration Application Publication No. 2-117945, a side surface and a lower portion of the door body are covered with the garnish. An upper portion of a side surface of the garnish is attached to the door body using fasteners, and a lower portion of the garnish is attached to the lower surface of the door body using attaching screws or using attaching screws with brackets interposed therebetween.

In the lower structure of the vehicle door described in Japanese Examined Utility Model Registration Application Publication No. 64-3687, the door body includes an outer panel and an inner panel. An opening of the inner panel and a side surface of the outer panel are covered with the garnish, and a lower portion of the garnish is fixed to the inner panel using fasteners.

However, the lower structure of the vehicle door described in Japanese Unexamined Utility Model Registration Application Publication No. 2-117945 disadvantageously needs a large number of parts since the lower portion of the garnish is attached to the lower surface of the door body using attaching screws or using attaching screws with brackets interposed therebetween.

Moreover, the lower structure of the vehicle door described in Japanese Examined Utility Model Registration Application Publication No. 64-3687 also disadvantageously needs a large number of parts as does the lower structure of the vehicle door described in Japanese Unexamined Utility Model Registration Application Publication No. 2-117945 since the lower portion of the garnish is fixed to the inner panel using fasteners.

SUMMARY OF THE INVENTION

According to one aspect of the present invention, a lower structure of a vehicle door includes a door body, a garnish, and an elastic seal. The door body is attached to a door opening of a vehicle body so as to be openable. The garnish covers an outer lower portion of the door body. The elastic seal includes a holding portion that clamps a flange portion at a lower end of the door body. The elastic seal is joined to the garnish. The garnish is supported by the door body via the elastic seal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

An embodiment of the present invention will now be described with reference to the drawings. Herein, the drawings are viewed in directions of reference signs.

Figure 1:
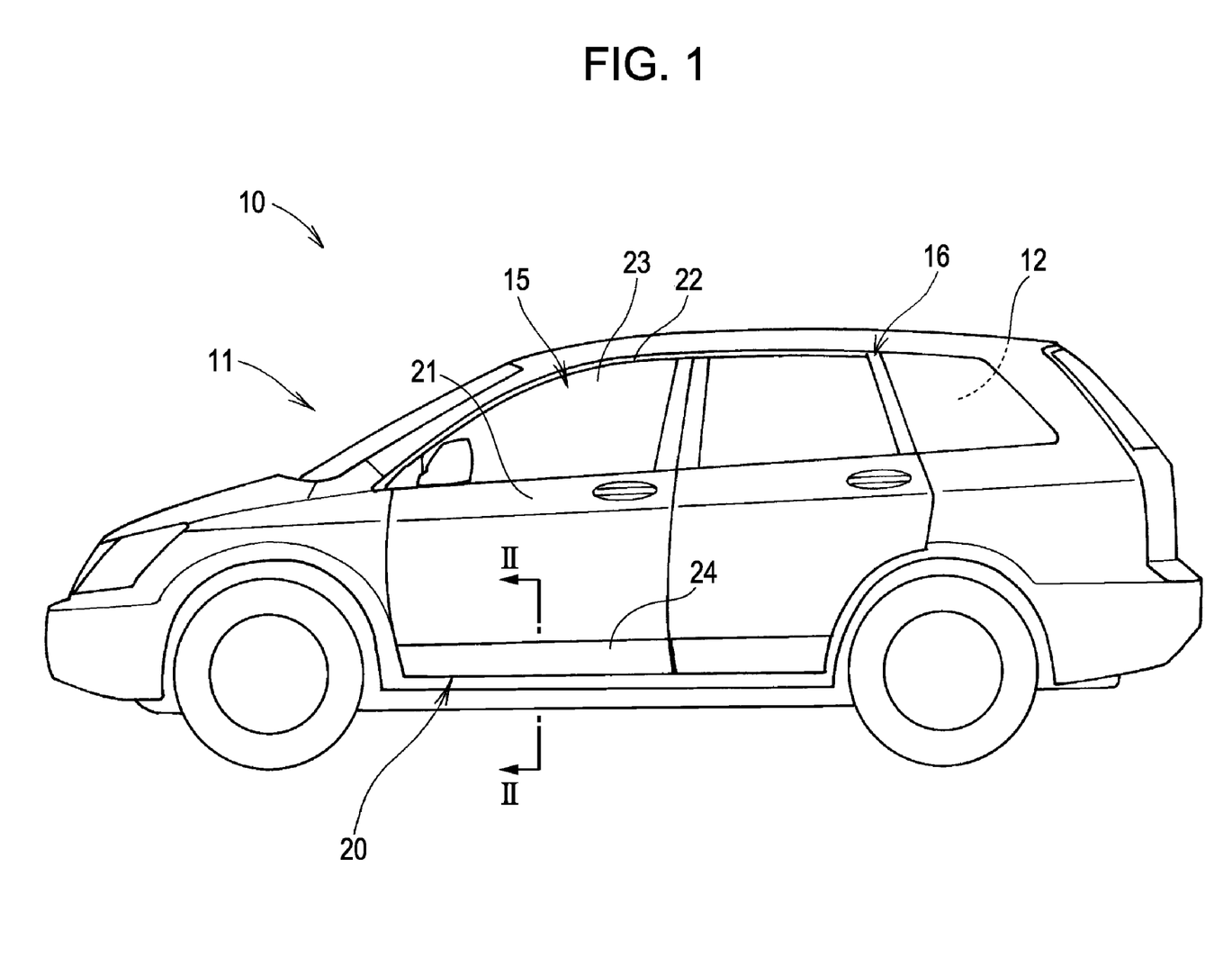
FIG. 1 is a side view of a vehicle into which a lower structure of a vehicle door according to an embodiment of the present invention is incorporated.
Figure 2:
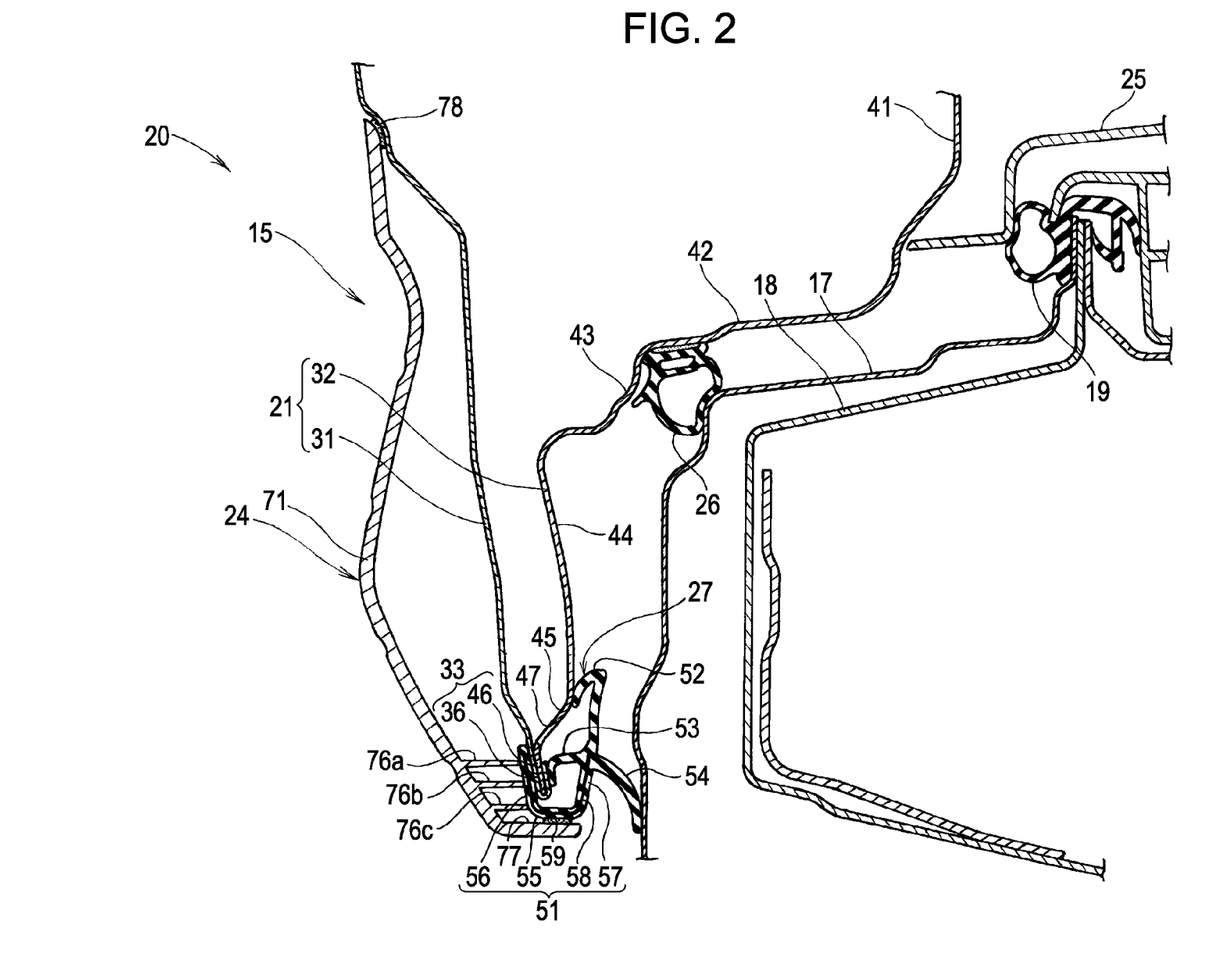
FIG. 2 is a cross-sectional view taken along line II-II in FIG. 1.
Figure 3:
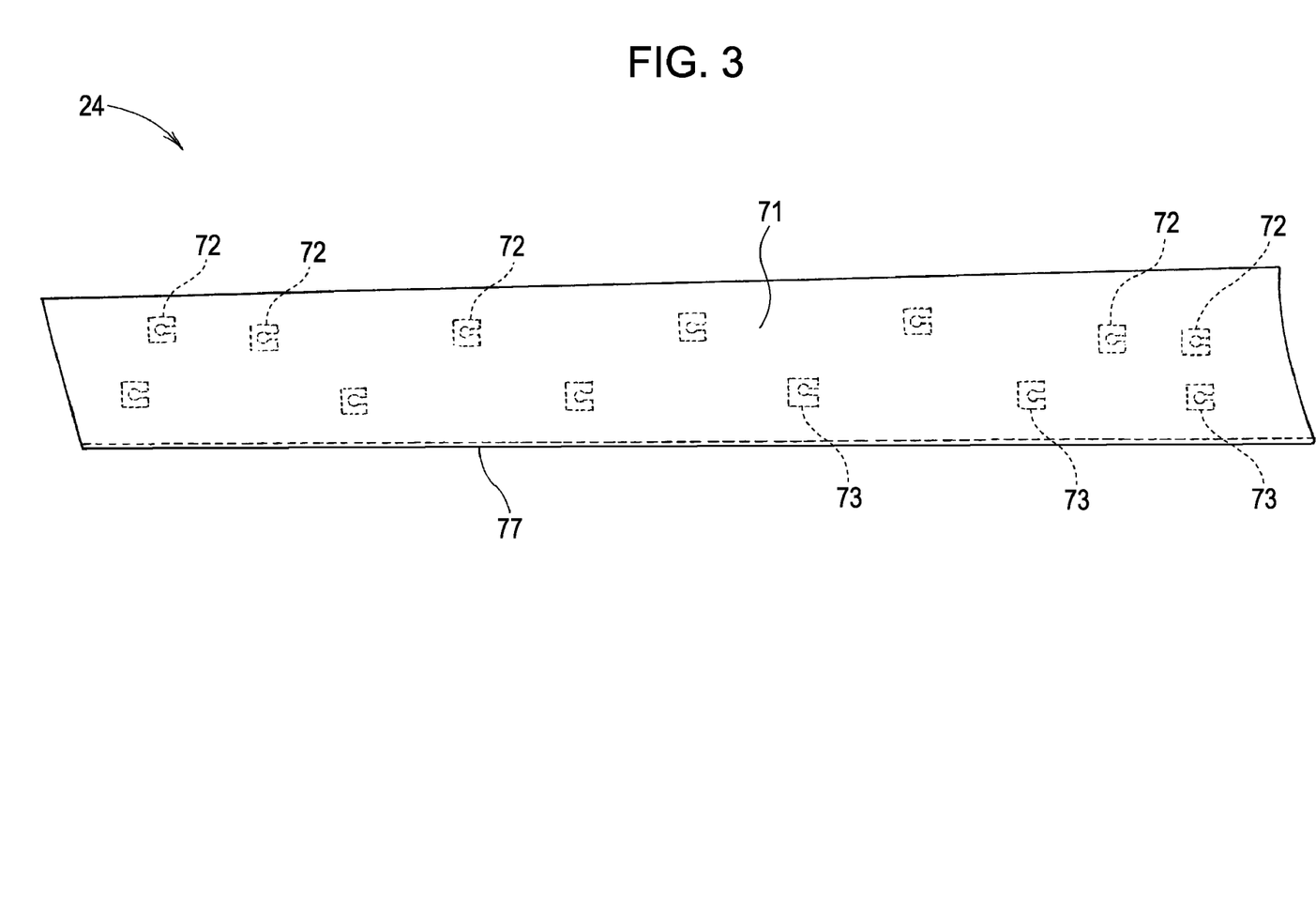
FIG. 3 is a side view of the garnish in the lower structure of the vehicle door shown in FIG. 2.

As shown in FIGS. 1 and 2, a vehicle 10 includes front doors 15, through which vehicle occupants enter and exit the vehicle, disposed at side surfaces of a vehicle body 11 so as to be openable and rear doors 16, through which vehicle occupants enter and exit the vehicle, disposed at the side surfaces of the vehicle body 11 so as to be openable.

A lower structure 20 of a vehicle door according to an embodiment of the present invention corresponds to the lower structure of the front doors 15. Accordingly, the front doors 15 will be hereinafter referred to as "vehicle doors 15". Herein, the rear doors 16 have the same lower structure as the front doors 15.

The vehicle body 11 includes door openings 17 to which the vehicle doors 15 are attached so as to be openable and first weather strips 19 disposed on the door openings 17 adjacent to side sills 18 and brought into contact with the vehicle doors 15.

The vehicle doors 15 each include a door body 21 attached to the corresponding door opening 17 of the vehicle body 11 so as to be openable, a window frame 22 disposed at an upper portion of the door body 21, a window glass 23 disposed inside the window frame 22 so as to be liftable, a garnish 24 disposed at an outer lower portion of the door body 21 so as to cover the lower portion of the door body 21, a door lining 25 disposed on the door body 21 adjacent to a vehicle cabin 12 so as to cover the inner surface of the door body 21, a second weather strip 26 disposed at a lower portion of the door body 21 so as to be brought into contact with the door opening 17 adjacent to the corresponding side sill 18, and an elastic seal 27 including a holding portion 51 that clamps a flange portion 33 at the lower end of the door body 21 and joined to the upper side of a lower surface 77 of the garnish 24.

The door body 21 includes an outer panel 31 and an inner panel 32. The outer panel 31 and the inner panel 32 form a closed section.

The outer panel 31 includes an outer flange 36 that forms the flange portion 33 together with an inner flange 46. The outer panel 31 corresponds to the outer surface of the door body 21. The inner panel 32 corresponds to the inner surface of the door body 21.

The inner panel 32 includes an upper vertical surface 41 extending in a vertical direction of the vehicle cabin 12, a flat surface 42 extending from the upper vertical surface 41 outward in a width direction of the vehicle, a curved surface 43 extending obliquely downward from the flat surface 42, an inner surface (lower vertical surface) 44 of the vehicle cabin extending downward from the curved surface 43 in the vertical direction of the door body 21, a slope 45 extending outward in the width direction of the vehicle (to outside the vehicle cabin) and downward from the inner surface 44 of the vehicle cabin, the inner flange 46 extending downward from the slope 45 and forming the flange portion 33 together with the outer flange 36 of the outer panel 31, and an opening 47 formed in the slope 45 and communicating with the closed section.

The opening 47 is covered with the elastic seal 27. The second weather strip 26 is disposed on the flat surface 42 adjacent to the curved surface 43.

The elastic seal 27 includes the holding portion 51 that clamps the flange portion 33 at the lower end of the door body 21, a first lip 52 disposed on an inner wall 57 of the holding portion 51 and extending above the slope 45 so as to be brought into contact with the inner surface (lower vertical surface) 44 of the vehicle cabin, a second lip 53 disposed on the inner wall 57 of the holding portion 51 and extending to the flange portion 33 so as to push the flange portion 33 toward an outer wall 56 of the holding portion 51, and a cabin seal portion (third lip) 54 extending from a midsection of the inner wall 57 to the inside of the vehicle cabin 12 so as to be brought into contact with the door opening 17.

The first lip 52 covers the opening 47 of the inner panel 32.

The holding portion 51 includes a bottom surface 55 joined (bonded) to the lower surface 77 of the garnish 24, the outer wall 56 extending upward from an outer portion of the bottom surface 55 in the width direction of the vehicle (outer end remote from the vehicle cabin), the inner wall 57 extending upward from an inner portion of the bottom surface 55 in the width direction of the vehicle (inner end adjacent to the vehicle cabin), and a core bar 58 disposed inside the bottom surface 55, the outer wall 56, and the inner wall 57 so as to maintain the shape of the holding portion 51.

The bottom surface 55 of the holding portion 51 is bonded to the lower surface 77 of the garnish 24 using an adhesive member (including double-sided adhesive tapes) 59.

Figure 4:
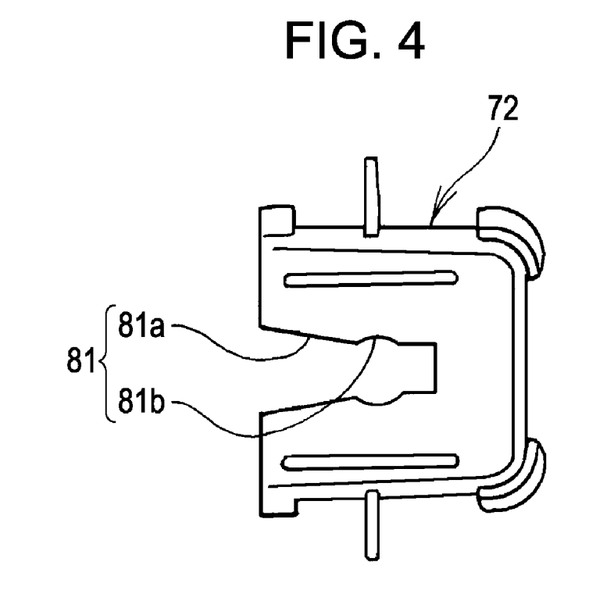
FIG. 4 is a rear view of an upper attaching portion of the garnish in the lower structure of the vehicle door shown in FIG. 2.
Figure 5:
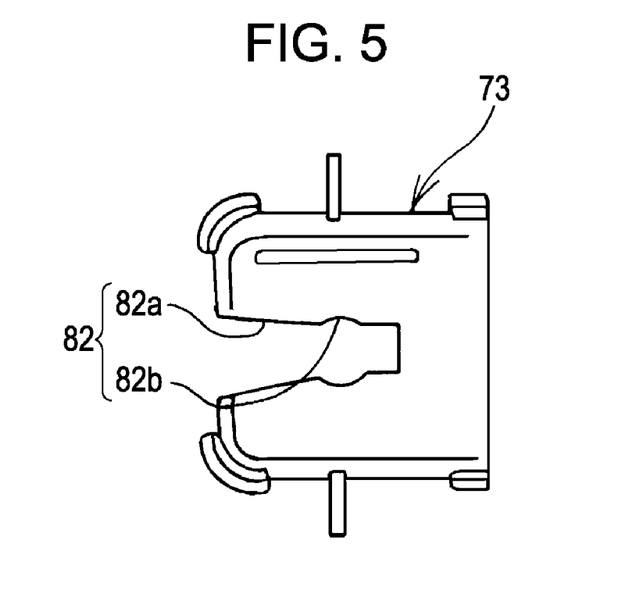
FIG. 5 is a rear view of a lower attaching portion of the garnish in the lower structure of the vehicle door shown in FIG. 2.
Figure 6:
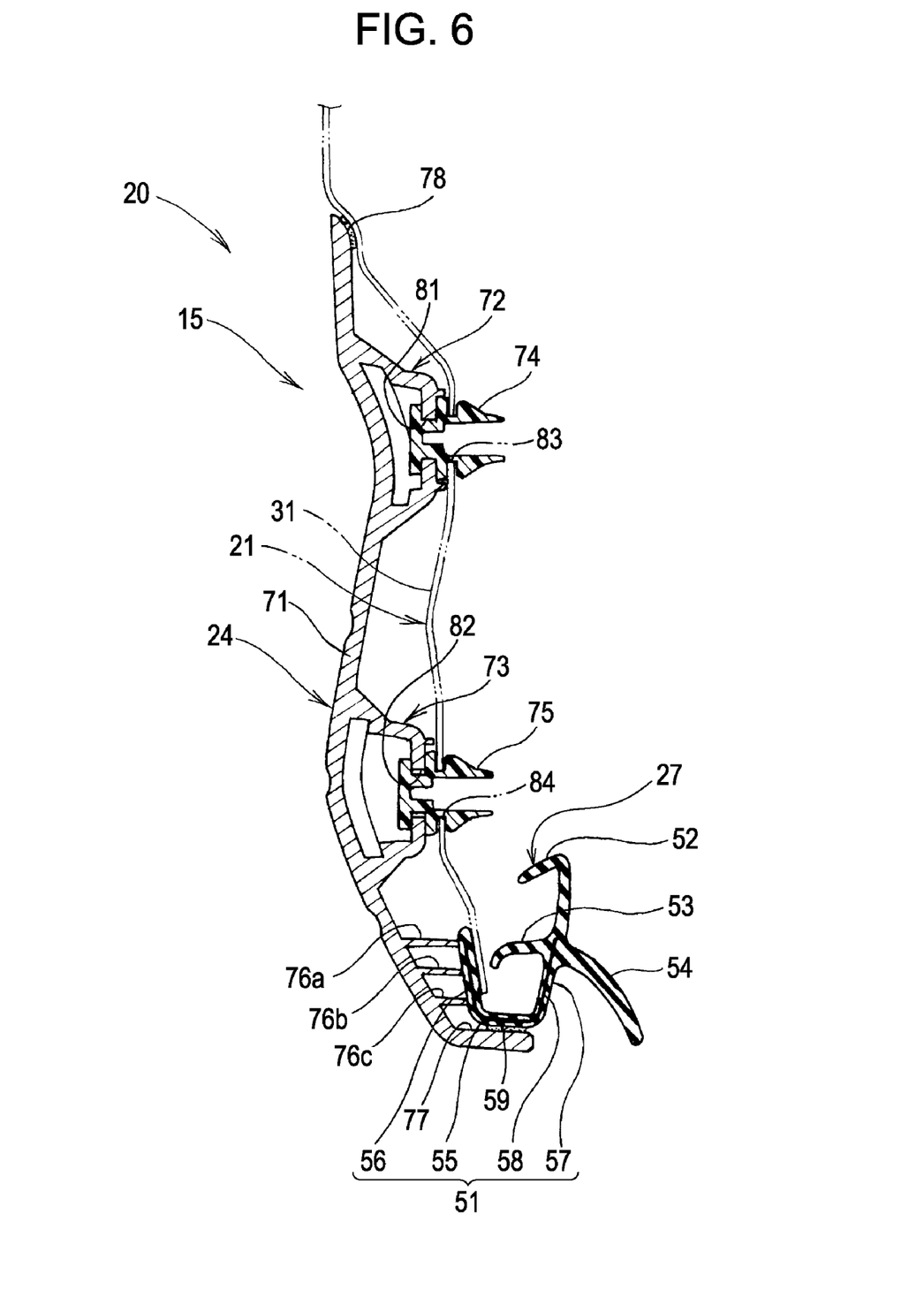
FIG. 6 is a cross-sectional view illustrating a state where an elastic seal and clips are attached to the garnish in the lower structure of the vehicle door shown in FIG. 2.

As shown in FIGS. 3 to 6, the garnish 24 includes a side surface (body) 71 extending along the outer surface of the door body 21, a plurality of upper attaching portions 72, into which corresponding upper attaching members 74 (only one member is shown in FIG. 6) are laterally fitted, formed on the side surface 71 adjacent to the door body 21, a plurality of lower attaching portions 73, into which corresponding lower attaching members 75 (only one member is shown in FIG. 6) are laterally fitted, formed on the side surface 71 adjacent to the door body 21, a plurality of ribs 76a to 76c formed at a lower portion of the side surface 71 and brought into contact with the outer wall 56 of the elastic seal 27, and the lower surface (flange portion) 77 extending from the lower end of the side surface 71 toward the center of the vehicle body (inside of the vehicle cabin).

A double-sided adhesive tape 78 is disposed at the upper end of the garnish 24 adjacent to the door body 21 so as to bond the garnish to the door body 21 and prevent the garnish from detaching from the door body 21. The attaching members 74 and 75 are the same parts, and more specifically, can be clips that draw and attach the garnish 24 to the outer surface of the door body 21.

The upper attaching portions 72 each have an upper slide hole 81 into which a corresponding upper attaching member (clip) 74 is laterally fitted. Similarly, the lower attaching portions 73 each have a lower slide hole 82 into which a corresponding lower attaching member (clip) 75 is laterally fitted.

The slide holes 81 and 82 have the same shape, and include guiding portions 81a and 82a, respectively, tapered to the opening ends and circular catching portions 81b and 82b, respectively, formed in the guiding portions 81a and 82a so as to catch the attaching members 74 and 75, respectively.

That is, the side surface 71 of the garnish 24 is drawn and attached to the outer surface of the door body 21 using the attaching members (clips) 74 and 75 by fitting the attaching members 74 and 75 into upper attaching holes 83 and lower attaching holes 84 (only each hole is shown in FIG. 6), respectively, formed in the outer surface (outer panel 31) of the door body 21, and the lower surface 77 of the garnish 24 is supported by the door body 21 via the elastic seal 27 joined to the upper side of the lower surface 77 of the garnish 24.

Figure 7A:
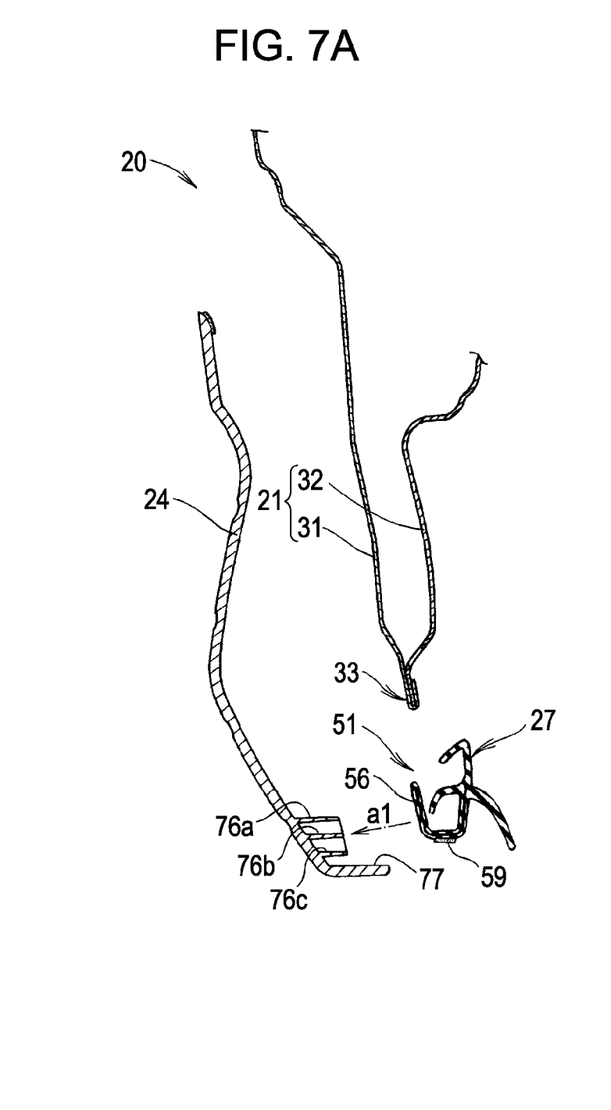
FIGS. 7A to 7C illustrate an example procedure for assembling the lower structure of the vehicle door shown in FIG. 2.

As shown in FIG. 7A, the elastic seal 27 is joined (bonded) to the garnish 24 in a direction of an arrow a1. More specifically, the bottom surface 55 of the holding portion 51 is joined to the lower surface 77 of the garnish 24. At this moment, the outer wall 56 of the holding portion 51 is brought into contact with the ribs 76a to 76c of the garnish 24.

Figure 7B:
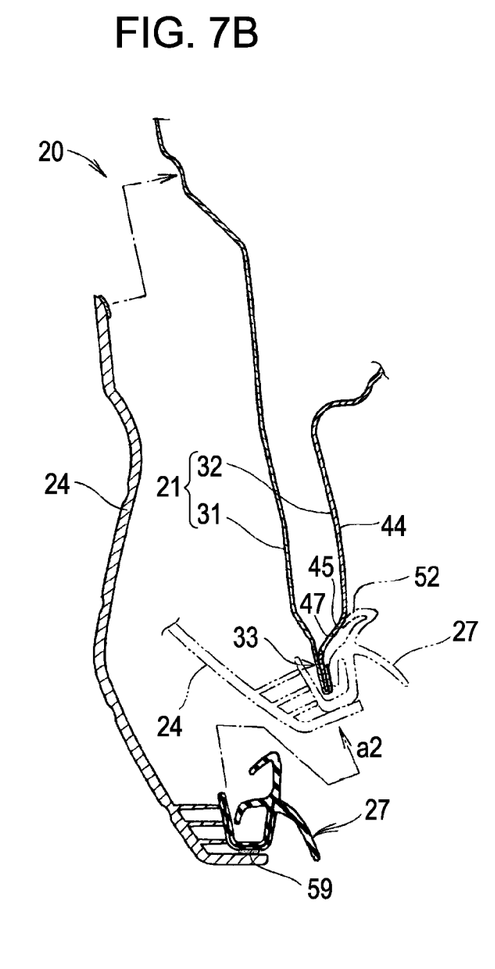

As shown in FIG. 7B, the garnish 24 to which the elastic seal 27 has been bonded is placed on the door body 21 in a direction of an arrow a2. More specifically, the first lip 52 of the elastic seal 27 is brought into contact with the slope 45 while the garnish 24 is inclined, the outer wall 56 of the holding portion 51 is placed on the flange portion 33 of the door body 21 while the first lip 52 is slid on the slope 45 to the inner surface (lower vertical surface) 44 of the vehicle cabin, and the garnish 24 is raised to the height at which the attaching members (clips) 74 and 75 face the attaching holes 83 and 84, respectively, as shown in FIG. 6.

Figure 7C:
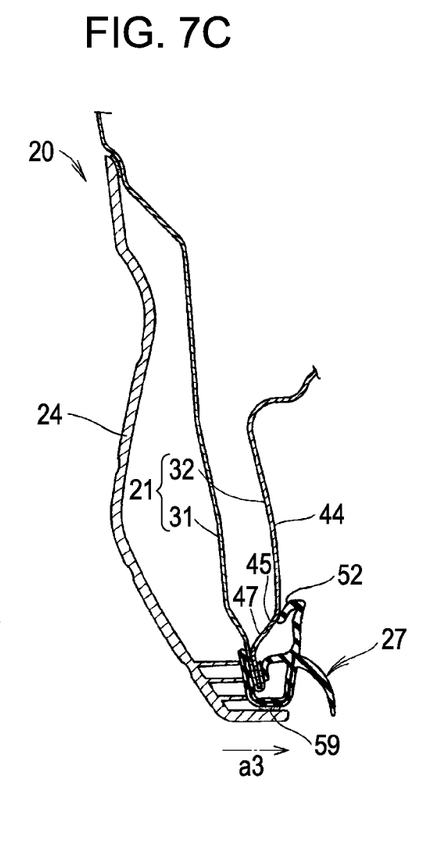

As shown in FIG. 7C, the garnish 24 to which the elastic seal 27 has been bonded is pushed toward the door body 21 in a direction of an arrow a3 so that the attaching members (clips) 74 and 75 shown in FIG. 6 are engaged with the attaching holes 83 and 84, respectively. In this manner, the garnish 24 is attached to the door body 21.

The first lip 52 pushes the inner surface (lower vertical surface) 44 of the vehicle cabin, and covers the opening 47 of the inner panel 32.

As shown in FIG. 2, the lower structure 20 of the vehicle door includes the door body 21 attached to the door opening 17 of the vehicle body 11 so as to be openable, the garnish 24 covering the outer lower portion of the door body 21, and the elastic seal 27 having the holding portion 51 that clamps the flange portion 33 at the lower end of the door body 21. The elastic seal 27 is joined to the garnish 24, and the garnish 24 is supported by the door body 21 via the elastic seal 27.

That is, since the flange portion 33 at the lower end of the door body 21 can be clamped by the elastic seal 27 joined to the garnish 24, the garnish 24 can be supported (held) at the lower end of the door body 21 without using, for example, fastening members or brackets. As a result, the number of parts required for the lower structure can be reduced.

As shown in FIG. 2, the garnish 24 includes the side surface 71 extending along the outer surface of the door body 21 and the lower surface 77 extending from the lower end of the side surface 71 to the inside of the vehicle cabin in the lower structure 20 of the vehicle door.

As shown in FIG. 6, the side surface 71 of the garnish 24 is attached to the outer surface of the door body 21 using the attaching members 74 and 75 fitted into the attaching holes 83 and 84, respectively, formed in the outer surface of the door body 21, and the elastic seal 27 is joined to the upper side (inside) of the lower surface 77. With this, the garnish 24 is restrained from moving in the vertical direction by the attaching members 74 and 75. As a result, the elastic seal 27 is prevented from falling off the flange portion 33 downward by the lower surface 77 of the garnish 24.

As shown in FIG. 2, the door body 21 forms a closed section using the outer panel 31 and the inner panel 32, and the inner panel 32 has the opening 47 communicating with the closed section. Since the opening 47 formed in the inner panel 32 can be covered with the elastic seal 27, noise outside the door body 21 can be prevented from entering through the opening 47 and echoing inside the closed section.

The inner panel 32 includes the inner surface (lower vertical surface) 44 of the vehicle cabin extending in the vertical direction of the door body 21, the slope 45 having the opening 47 and bent from the inner surface 44 of the vehicle cabin to outside the vehicle cabin, and the inner flange 46 bent downward from the slope 45 and forming the flange portion 33 together with the outer flange 36 of the outer panel 31.

The holding portion 51 includes the bottom surface 55 joined to the garnish 24, the outer wall 56 extending upward from the outer end of the bottom surface 55 remote from the vehicle cabin, and the inner wall 57 extending upward from the inner end of the bottom surface 55 adjacent to the vehicle cabin.

Since the first lip 52 extending above the slope 45 and brought into contact with the inner surface 44 of the vehicle cabin is formed on the inner wall 57 of the holding portion 51, the opening 47 can be reliably covered after the elastic seal 27 joined to the garnish 24 is assembled with the flange portion 33.

Since the elastic seal 27 in the lower structure 20 of the vehicle door includes the cabin seal portion (third lip) 54 brought into contact with the door opening 17 as shown in FIG. 2, sealing performance between the door body 21 and the door opening 17 can be improved. Moreover, the number of parts required for the lower structure can be reduced compared with the case when the cabin seal portion 54 is formed of another component.

Since the inner wall 57 includes the second lip 53 extending toward the flange portion 33 and the second lip 53 pushes the flange portion 33 toward the outer wall 56 while the outer wall 56 is in contact with the flange portion 33 in the lower structure 20 of the vehicle door, the elastic seal 27 can be restrained from moving in the width direction of the vehicle.

As shown in FIG. 6, the garnish 24 includes the ribs 76a to 76c brought into contact with the outer wall 56, and is attached to the door body 21 while being drawn to the outer surface of the door body 21 in the lower structure 20 of the vehicle door. With this, the elastic seal 27 can be restrained from moving in the width direction of the vehicle more effectively.

Although the lower structure of the vehicle door according to the above-described embodiment of the present invention is incorporated into the front doors 15 shown in FIG. 1, the present invention is not limited to this, and can be incorporated into other doors such as the rear doors 16 or sliding doors.

Moreover, although the slope 45 of the door body 21 extends downward and outward as shown in FIG. 2 in the lower structure of the vehicle door according to the above-described embodiment of the present invention, the present invention is not limited to this, and the slope can be a horizontal surface or a slope extending upward and outward.

The lower structure of the vehicle door according to the above-described embodiment of the present invention is preferably incorporated into passenger cars such as sedans and station wagons.

According to an embodiment of the present invention, the garnish preferably includes a side surface extending along the outer surface of the door body and a lower surface extending from the lower end of the side surface to the inside of the vehicle cabin. The side surface is preferably attached to the outer surface of the door body using an attaching member fitted into an attaching hole formed in the outer surface of the door body, and the elastic seal is preferably joined to the upper side of the lower surface. With this, the garnish is restrained from moving in the vertical direction by the attaching member. As a result, the elastic seal is prevented from falling off the flange portion downward by the lower surface of the garnish.

According to an embodiment of the present invention, the door body preferably forms a closed section using an outer panel and an inner panel, and the inner panel preferably has an opening communicating with the closed section. The elastic seal preferably covers the opening formed in the inner panel. With this, noise outside the door body can be prevented from entering through the opening and echoing inside the closed section.

According to an embodiment of the present invention, the inner panel preferably includes an inner surface of the vehicle cabin extending in the vertical direction of the door body, a slope having the opening and bent from the inner surface of the vehicle cabin to outside the vehicle cabin, and an inner flange bent downward from the slope and forming the flange portion together with an outer flange of the outer panel.

The holding portion preferably includes a bottom surface joined to the garnish, an outer wall extending upward from the outer end of the bottom surface remote from the vehicle cabin, and an inner wall extending upward from the inner end of the bottom surface adjacent to the vehicle cabin.

The inner wall preferably extends above the slope, and preferably includes a first lip brought into contact with the inner surface of the vehicle cabin. With this, the opening can be reliably covered after the elastic seal joined to the garnish is assembled with the flange portion.

According to an embodiment of the present invention, the elastic seal preferably includes a cabin seal portion that is brought into contact with the door opening. With this, sealing performance between the door body and the door opening can be improved. Moreover, the number of parts required for the lower structure can be reduced compared with the case when the cabin seal portion is formed of another component.

According to an embodiment of the present invention, the inner wall preferably includes a second lip extending toward the flange portion, and the outer wall is preferably brought into contact with the flange portion while the flange portion is pushed toward the outer wall by the second lip. With this, the elastic seal can be restrained from moving in the width direction of the vehicle.

According to an embodiment of the present invention, the garnish preferably includes a rib that is brought into contact with the outer wall, and is preferably attached to the door body while being drawn to the outer surface of the door body. With this, the elastic seal can be restrained from moving in the width direction of the vehicle more effectively.

Obviously, numerous modifications and variations of the present invention are possible in light of the above teachings. It is therefore to be understood that within the scope of the appended claims, the invention may be practiced otherwise than as specifically described herein.

What is claimed is:

1. A lower structure of a vehicle door, comprising:
    a door body having a flange portion at a lower end of the door body and attached to a door opening of a vehicle body so as to be openable;
    a garnish that covers an outer lower portion of the door body; and
    an elastic seal comprising a holding portion that clamps the flange portion of the door body, the elastic seal being joined to the garnish, the garnish being supported by the door body via the elastic seal.

2. The lower structure of the vehicle door according to claim 1, wherein
    the garnish comprises a side surface extending along an outer surface of the door body and a lower surface extending from a lower end of the side surface to an inside of a vehicle cabin,
    the side surface is attached to the outer surface of the door body using an attaching member fitted into an attaching hole formed in the outer surface of the door body, and
    the elastic seal is joined to an upper side of the lower surface.

3. The lower structure of the vehicle door according to claim 1, wherein
    the door body forms a closed section using an outer panel and an inner panel,
    the inner panel has an opening communicating with the closed section, and
    the elastic seal covers the opening.

4. The lower structure of the vehicle door according to claim 3, wherein:
    the inner panel comprises
        an inner surface of the vehicle cabin extending in a vertical direction of the door body,
        a slope having the opening and being bent from the inner surface of the vehicle cabin to an outside of the vehicle cabin, and
        an inner flange bent downward from the slope and forming the flange portion together with an outer flange of the outer panel;
    the holding portion comprises
        a bottom surface joined to the garnish,
        an outer wall extending upward from an outer end of the bottom surface remote from the vehicle cabin, and
        an inner wall extending upward from an inner end of the bottom surface adjacent to the vehicle cabin; and
    the inner wall extends above the slope and comprises a first lip brought into contact with the inner surface of the vehicle cabin.

5. The lower structure of the vehicle door according to claim 1, wherein the elastic seal comprises a cabin seal portion that is brought into contact with the door opening.

6. The lower structure of the vehicle door according to claim 4, wherein
    the inner wall comprises a second lip extending toward the flange portion, and
    the outer wall is brought into contact with the flange portion while the flange portion is pushed toward the outer wall by the second lip.

7. The lower structure of the vehicle door according to claim 6, wherein the garnish comprises a rib that is brought into contact with the outer wall and that is attached to the door body while being drawn to the outer surface of the door body.

8. The lower structure of the vehicle door according to claim 2, wherein
    the door body forms a closed section using an outer panel and an inner panel,
    the inner panel has an opening communicating with the closed section, and
    the elastic seal covers the opening.

9. The lower structure of the vehicle door according to claim 2, wherein the elastic seal comprises a cabin seal portion that is brought into contact with the door opening.

10. The lower structure of the vehicle door according to claim 3, wherein the elastic seal comprises a cabin seal portion that is brought into contact with the door opening.

11. The lower structure of the vehicle door according to claim 4, wherein the elastic seal comprises a cabin seal portion that is brought into contact with the door opening.

12. The lower structure of the vehicle door according to claim 1, wherein the elastic seal is bonded to the garnish by an adhesive.

13. The lower structure of the vehicle door according to claim 12, wherein a lower portion of the garnish is fixed to the door body via the holding portion of the elastic seal by bonding the elastic seal to the garnish to be integral with the garnish and by clamping the flange portion of the door body using the holding portion of the elastic seal.

14. The lower structure of the vehicle door according to claim 2, wherein the lower surface of the garnish extends more to the vehicle cabin than the flange portion of the door body, and the holding portion of the elastic seal includes a bottom portion jointed to an upper side of the lower surface.

15. The lower structure of the vehicle door according to claim 1, wherein the holding portion comprises
    a bottom portion provided under the flange portion,
    a first wall extending upward from the bottom portion and provided between the flange portion and the garnish, the first wall being provided in contact with the flange portion,
    a second wall extending upward from the bottom portion and provided on an opposite side of the first wall with respect to the flange portion, the second wall being spaced apart from the flange portion to provide a space between the second wall and the flange portion, and
    a supporting lip extending from the second wall toward the flange portion and provided in contact with the flange portion, the flange portion being provided between the first wall and the supporting lip and being clamped by the first wall and the supporting lip.

16. The lower structure of the vehicle door according to claim 15, wherein the elastic seal comprises a cabin seal portion provided in contact with the door opening and extending from the second wall to an opposite side of the supporting lip.

17. The lower structure of the vehicle door according to claim 15, wherein the elastic seal comprises a seal lip extending from the second wall toward the door body and provided in contact with the door body, the seal lip being provided above the supporting lip.

18. The lower structure of the vehicle door according to claim 15,
wherein the garnish comprises
a side portion extending along an outer surface of the door body, and
a lower portion provided under the elastic seal and extending from a lower end of the side portion toward the second wall, and
wherein the bottom portion of the elastic seal is bonded to an upper side of the lower portion of the garnish by an adhesive.

19. The lower structure of the vehicle door according to claim 15, wherein the holding portion comprises a core member provided inside the bottom portion, the first wall, and the second wall to maintain a shape of the holding portion.

* * * * *